(12) United States Patent
Castelli et al.

(10) Patent No.: US 7,277,826 B2
(45) Date of Patent: Oct. 2, 2007

(54) APPARATUS AND METHOD FOR DETECTING AND FORECASTING RESOURCE BOTTLENECKS

(75) Inventors: Vittorio Castelli, Croton-on-Hudson, NY (US); Peter Franaszek, Mt. Kisco, NY (US); Luis A. Lastras, Tarrytown, NY (US)

(73) Assignee: International Business Machines Corporation, Armonk, NY (US), .

( * ) Notice: Subject to any disclaimer, the term of this patent is extended or adjusted under 35 U.S.C. 154(b) by 513 days.

(21) Appl. No.: 10/647,800

(22) Filed: Aug. 25, 2003

(65) Prior Publication Data

US 2005/0050404 A1    Mar. 3, 2005

(51) Int. Cl.
G06F 11/30 (2006.01)
G21C 17/00 (2006.01)

(52) U.S. Cl. ...................................... 702/186; 702/185

(58) Field of Classification Search ................ 702/186, 702/182, 183; 714/39, 47, 48
See application file for complete search history.

(56) References Cited

U.S. PATENT DOCUMENTS

| | | | | |
|---|---|---|---|---|
| 6,405,327 B1 * | 6/2002 | Sipple et al. | | 714/39 |
| 6,557,035 B1 * | 4/2003 | McKnight | | 709/224 |
| 2002/0177910 A1 * | 11/2002 | Quarterman et al. | | 700/28 |

* cited by examiner

*Primary Examiner*—Michael Nghiem
(74) *Attorney, Agent, or Firm*—Daniel P. Morris, Esq.; Perman & Green, LLP

(57) ABSTRACT

A system and method of detecting and forecasting resource bottlenecks of a computer system. In one aspect, a method includes the steps of: monitoring with successive measurements a utilization parameter of a system resource; computing a change parameter by comparing the differences between successive measurements of the utilization parameter; comparing the change parameter to a threshold change parameter; and reporting a resource bottleneck if the change parameter exceeds the threshold change parameter.

17 Claims, 3 Drawing Sheets

APPARATUS AND METHOD FOR DETECTING AND FORECASTING RESOURCE BOTTLENECKS

BACKGROUND OF THE INVENTION

1. Field of the Invention

The present invention relates to computer hardware performance monitoring and more particularly to an apparatus and method for detecting and forecasting resource bottlenecks.

2. Earlier Related Developments

Computer systems may interconnect in complex computer networks, to share data, services and resources associated with local and/or distributed computing environments. Computer systems can include a plurality of processors, personal computers, workstations, storage servers, database servers, mainframes, network attached devices, routers, firewalls, and other devices, all interconnected by wired or wireless interconnection networks. A critical resource is a part of the system upon which the overall performance of the system relies significantly. As such, when a critical resource is operated in a failed, saturated, or near-saturation regime, it may become a resource bottleneck to the efficient operation of the system. To maintain or optimize performance, it is important to detect and locate resource bottlenecks either when they occur or in a predictive manner before they take place in order to take corrective or preventative actions. Methods relating to bottleneck detection are related generally to the field of capacity management. In one such method, a device, such as a processor, is measured and compared to whether it is operating near capacity by comparing the value of its utilization to a known maximum value threshold. Other methods expand on this approach to allow different bottleneck detection strategies based on simple threshold comparisons such as where bottlenecks are declared when one or more subsystems are operating near saturation even though other subsystems are under utilized. Examples of bottleneck methods are illustrated in U.S. Pat. Nos. 6,557,035, 6,470,464 and 6,457,143, all of which are incorporated by reference herein in their entirety. A problem arises in that some methods rely on known maximum values for resource utilization that may not be available such as where the throughput of a large scale storage system is dependent on the kinds of data that are stored on the system, the status of the physical storage medium, and/or its internal interconnect network as examples. In this instance, the maximum throughput may be time variant and standard bottleneck detection would fail. Accordingly, there is a desire to provide a resource bottleneck detection, prevention and/or elimination method and system that is simple, and robust.

SUMMARY OF EXEMPLARY EMBODIMENTS

In accordance with one embodiment, a method of detecting and forecasting resource bottlenecks of a computer system is provided having a first step of monitoring with successive measurements a utilization parameter of a system resource. Steps of computing a change parameter by comparing the differences between successive measurements of the utilization parameter and comparing the change parameter to a threshold change parameter are then provided. A step of reporting a resource bottleneck if the change parameter exceeds the threshold change parameter is then provided.

In accordance with another embodiment, a computer program product is provided having a computer useable medium having computer readable code means embodied thereon for causing a computer to execute a method for detecting and forecasting resource bottlenecks of a computer system. The computer readable code means in the computer program product has computer readable program code means for causing a computer to monitor with successive measurements a utilization parameter of a system resource. Computer readable program code means for causing a computer to compute a change parameter by comparing the differences between successive measurements of the utilization parameter and computer readable program code means for causing a computer to compare the change parameter to a threshold change parameter is also provided. Computer readable program code means for causing a computer to report a resource bottleneck if the change parameter exceeds the threshold change parameter is then provided.

In accordance with another embodiment, a data processing system is provided having a processor and a program code executed on the processor for detecting and forecasting resource bottlenecks, the program code including code for: monitoring with successive measurements a utilization parameter of a system resource; computing a change parameter by comparing the differences between successive measurements of the utilization parameter; comparing the change parameter to a threshold change parameter; and predicting a resource bottleneck if the change parameter exceeds the threshold change parameter.

BRIEF DESCRIPTION OF THE DRAWINGS

The foregoing aspects and other features of the present invention are explained in the following description, taken in connection with the accompanying drawings, wherein.

DETAILED DESCRIPTION OF THE EXEMPLARY EMBODIMENT

Figure 1:
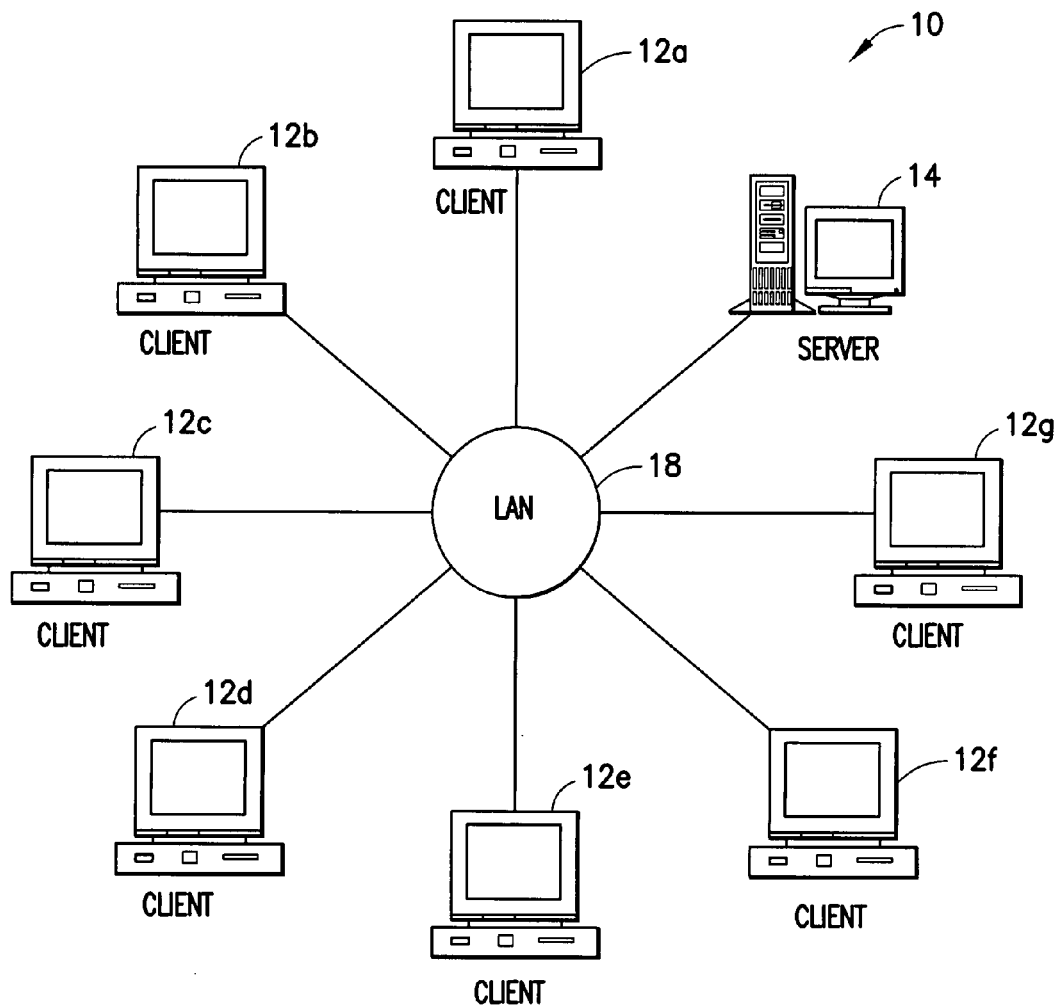
FIG. 1 is a schematic view of a computer system network incorporating features of an exemplary embodiment.
Figure 2:
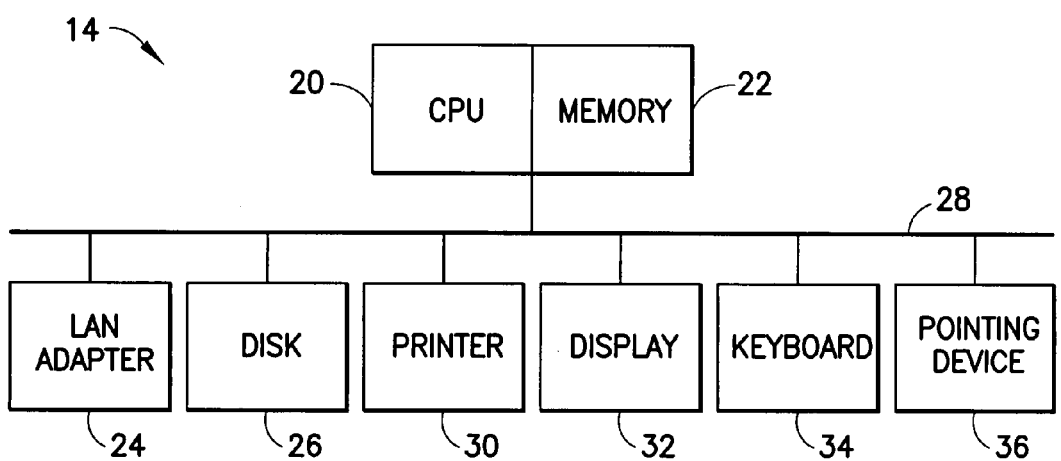
FIG. 2 is a block diagram of hardware resources of a server incorporating features of the exemplary embodiment.

Referring to FIG. 1, there is shown a schematic view of a computer system network 10 incorporating features of an exemplary embodiment of the present invention. Referring also to FIG. 2, there is shown a block diagram of the hardware resources of server 14 incorporating features of the exemplary embodiment. Computer system 10 can include a plurality of processors, personal computers, workstations, storage servers, database servers, mainframes, network attached devices, routers, firewalls, and other devices, all interconnected by wired or wireless interconnection networks. Although the present invention will be described with reference to the embodiments shown in the drawings, it should be understood that the present invention can be embodied in many alternate forms of embodiments. In addition, any suitable size, shape or type of elements or materials could be used.

Computer System Network 10 may include a plurality of client machines 12 and a server machine 14. Machines 12 and 14 are connected to a local area network (LAN) 18. Network 10 is depicted in a ring topology. In alternate embodiments, the method and system of the present invention may be applicable to other network topologies and configurations. Additionally, the method and system of the present invention may be applicable to wide area networks (WANs), intranets, the internet, as well as local area networks. Server 14 may include a central processing unit (CPU) 20. In alternate embodiments, server 14 may include multiple CPUs. Server 14 also includes memory 22. CPU 20 may access memory 22 to perform computing tasks. Server 14 may include peripheral devices or resources necessary to perform its server functions. The resources may include a LAN adapter 24 and a disk or memory storage device 26 that may be connected to CPU 20 and memory 22 by a I/O bus 28. In alternate embodiments, server 14 may include multiple LAN adapters 24 and multiple disks 26. Server 14 may include peripheral devices such as a printer 30, a display 32, a keyboard 34, and a pointing device 36, all of which may be connected with CPU 20 and memory 22 by IO bus 28. The resources that may be applicable to the method and system of the present invention may be, for example, CPU 20, memory 22, LAN adaptor 24, and disk or memory storage 26. In alternate embodiments, other resources, either hardware resources, software resources or otherwise may be applicable to the method and system of the present invention. Parameters associated with utilization of resources such as CPU 20, memory 22, LAN adaptor 24, and disk 26, may be monitored by the server 14 with performance monitoring tool. In alternate embodiments, different parameters may be measured on different hardware or software components on different tools or platforms. Examples of monitored parameters may include CPU utilization, memory utilization, either logical disk queue depth or disk utilization, LAN bytes per second (LAN byte throughput) and LAN packets per second (LAN packet throughput). A rules-based methodology according to the present invention may be applied for detecting and forecasting resource bottlenecks and generating or executing corrective action recommendations on how to circumvent or remedy the identified bottlenecks with upgrades.

Figure 3:
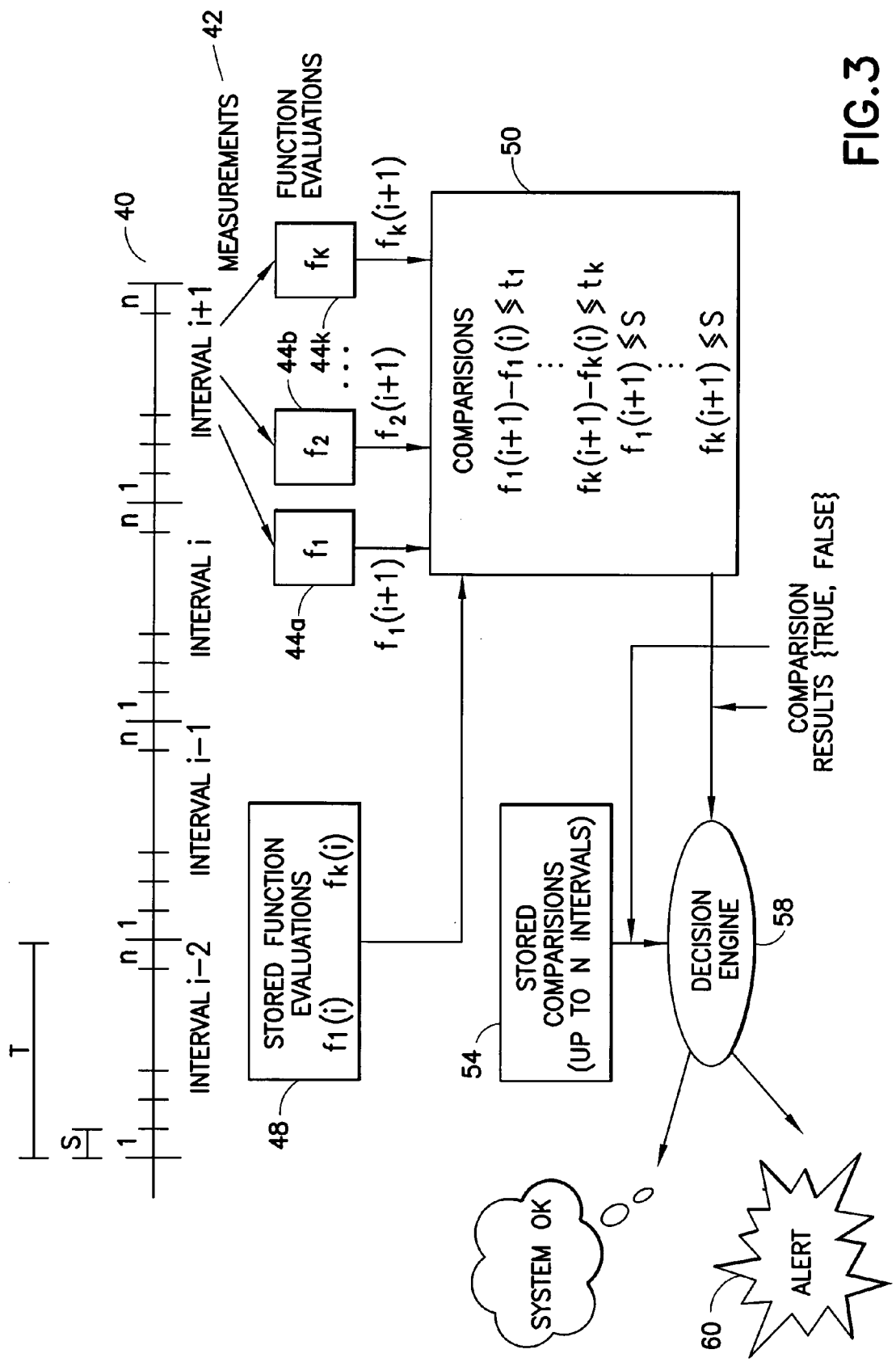
FIG. 3 is high level flow diagram for detecting and forecasting resource bottlenecks according to the exemplary embodiment.
Figure 4:
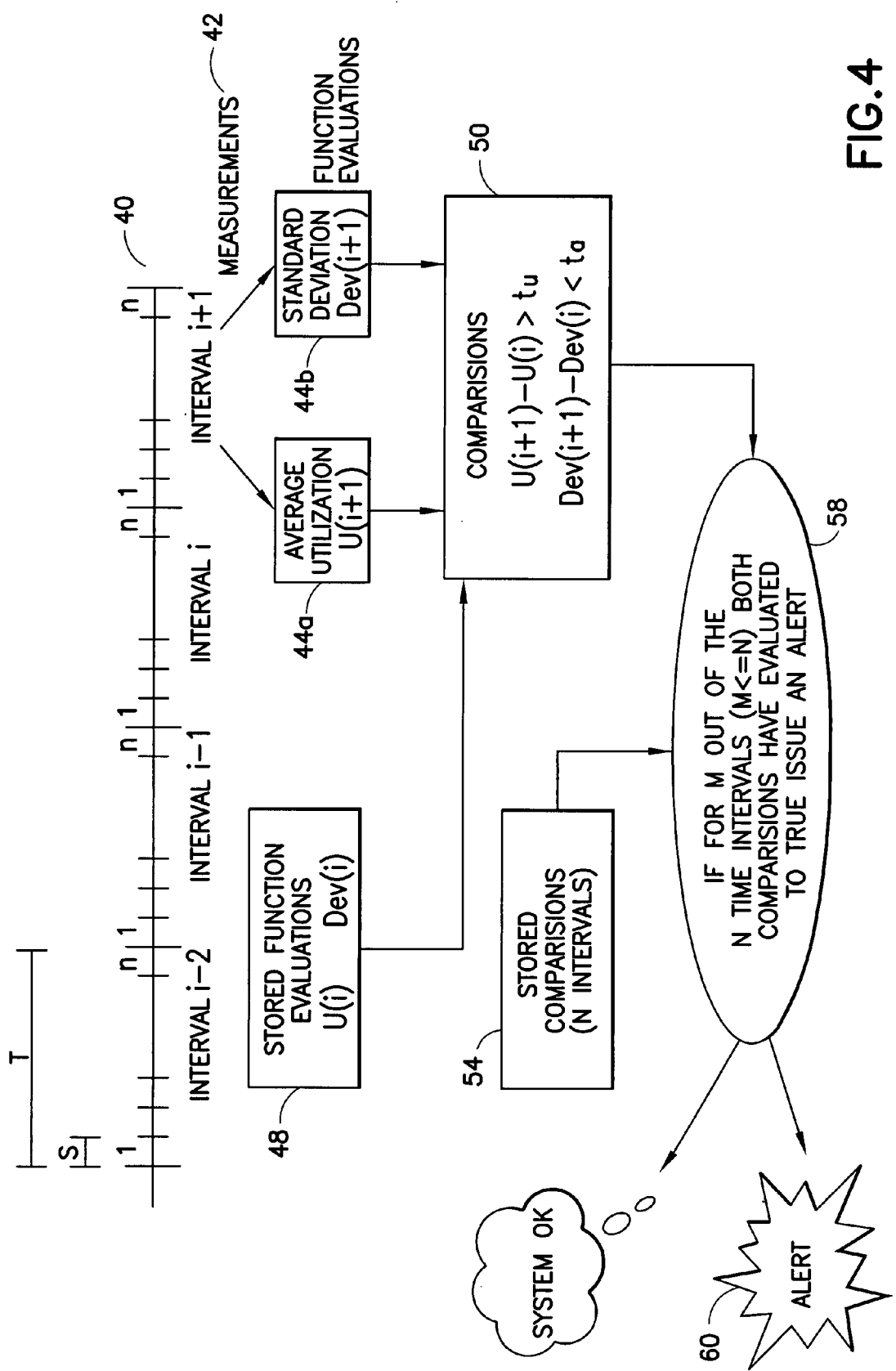
FIG. 4 is high level flow diagram for detecting and forecasting resource bottlenecks according to another exemplary embodiment.

Referring now to FIG. 3, there is shown a high level flow diagram of a method for detecting and forecasting resource bottlenecks according to the present invention. The method is based on detecting bottlenecks from the temporal evolution of the utilization of a resource rather than its instantaneous value. In the exemplary embodiments, rather than simply comparing values of utilization to thresholds, the methods compare the differences between values measured in successive time intervals to thresholds. In these methods, the maximum utilization value of the resource may not be used or know. As such, bottlenecks may be detected in portions of the system that are not being measured directly, where the bottleneck prevents the measured resource from being fully utilized. Measurements are taken within intervals every S seconds on the utilization of a resource where S may be constant or variable. The measurements may be taken at regular intervals or at varying intervals and adjusted or normalized accordingly. These measurements may be the value of counters, or may be for example CPU utilization where an actual percentage or percentages of utilization may be available. Here, the machine may indicate that in a period of S seconds, the CPU utilization was some number or some percent of the maximum. Alternately, the measurements or counters may indicate, for example, that some number of I/O operations occurred during the interval of duration S where, for example, it may not be known what percentage of I/O bandwidth had actually been utilized. In any event, even if, for example, the indicated CPU utilization is low compared to the maximum, bottlenecks elsewhere in the system may be limiting throughput. When utilization somewhere in the system approaches a level where there is a bottleneck, an increasing percentage of intervals of duration S approach maximum available load. This can occur if even, for example, the measured resource does not approach full utilization. Such occurrences may be detected by observing certain properties of the evolution with time of the utilization observations. Such observation may be accomplished by observing properties of the changes over time of the utilization measurements and then exploiting these observations. Timeline 40 has time intervals of length T. Each interval T has n periods of length S. In each interval, measurements 42 are taken relating to parameters of one or more resource. These measurements are evaluated in function blocks 44a, 44b, . . . 44k and the resulting functions or values may be stored in storage block 48. Comparisons such as, for example, differences between functions over time may be performed in block 50. Comparisons may be stored in block 54 for subsequent use. A decision engine in block 58 determines if the system is acceptable or if, for example, bottlenecks are detected or predicted to initiate an alert or corrective action 60. Referring also to FIG. 4, there is shown an exemplary implementation of a method for detecting and forecasting resource bottlenecks. U(I) may denote, for example, the utilization during the ith interval, i=1,2, . . . , n of a resource. In one implementation, for each interval of length T, the associated periods of length S may be divided into R classes, r=1,2, . . . , R where the rth class contains approximately n/R intervals where the utilization was larger than that for the (r−1) class. U(r,i) may be the average utilization for the rth class in period i. Let Delta(r,i)=U(r,i+1)−U(r,i). If Delta(r,i)<=Delta(r−1,1), and Delta (r,i)>0, for r=R, R−1, . . . R−Q, for a chosen value of Q, the system alerts the administrator. In another implementation, rather than computing the difference of the average utilization Avdel(i), the standard deviation Dev(i) is computed for the utilization measurements in the periods of length S in the ith interval of length T. The system alerts the administrator if U(i+1) is greater than U(i), and Dev(i)>Dev(i+1). As saturation is approached, some work may arrive in a period of length S, but not be completed until the following period resulting in a spillover effect. As the load increases, this spillover effect becomes manifest, as an increase of the fraction of time in which the system experiences heavier loads, as processor capacity is approached in periods already heavily loaded. The occurrence is detected as follows.

Med(i) represents the median load for the periods of length S in the ith interval of length T. The administrator is alerted if Med(i) is smaller than U(i), but Med(i+1) is greater than U(i+1). This embodiment is termed the median-crossing detector.

Measurements taken from the system may possess short term variations that could unnecessarily trigger alarms. In order to improve the bottleneck detector's resistance to noise, a threshold can be added to the comparisons that are judged to be exposed to such problems. Suitable values for the thresholds can be manually or automatically set through empirical means and later modified by the administrator through a user interface. An example is extended from an embodiment where the thresholds states that we will alert the administrator if U(i+1) exceeds the value of U(i) by at least a threshold tsubu and if Dev(i+1) is smaller than Dev(i)

by at least tsubd. Values for tsubu and tsubd may be learned or modified by employing an iterative process of modifying the thresholds as transient false alarms and undetected problems present themselves.

Another method of improving the quality of the alarms is to employ data from more than two intervals of length T; this can be done independently of whether thresholds are being employed. One method of extending any of the embodiments described is to use information from additional periods and to delay triggering the alarm until a problem is detected in M out of the last N time intervals (M<=N). A method in which both thresholds and multiple time intervals are employed is demonstrated by modifying the median-crossing detector previously described. An alert is issued to the administrator if in the last N intervals, a time interval i is located for which $Med(i)<U(i)-t_i$ and a later time interval j for which $Med(j)>U(j)+t_j$.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of detecting and forecasting resource bottlenecks of a computer system comprising:
    monitoring with successive measurements a utilization parameter of a system resource;
    computing a change parameter by comparing the differences between successive measurements of the utilization parameter;
    comparing the change parameter to a threshold change parameter;
    reporting a resource bottleneck if the change parameter exceeds the threshold change parameter; and
    detecting false bottleneck alarms and modifying the threshold change parameter based on the false bottleneck alarms to decrease a sensitivity of the method.

2. The method of claim 1 further comprising detecting bottlenecks that are not reported resource bottlenecks and modifying the threshold change parameter based on detecting bottlenecks that are not reported resource bottlenecks to increase a sensitivity of the method.

3. The method of claim 1 wherein reporting the resource bottleneck if the change parameter exceeds the threshold change parameter further comprises delaying reporting the resource bottleneck until the change parameter exceeds the threshold change parameter on at least one successive measurements.

4. The method of claim 1 wherein the utilization parameter includes an average utilization of the system resource for a time period and wherein computing a change parameter by comparing the differences between successive measurements of the utilization parameter comprises subtracting successive measurements of the utilization parameter, and wherein the utilization parameter is distributed in sequentially consecutive utilization classes of increasing utilization, the average utilization for each time period being established for each utilization class, and wherein computing the change parameter comprises comparing the difference between average utilization for consecutive classes at least at two different time periods.

5. The method of claim 1 wherein the utilization parameter includes a standard deviation of the utilization of the system resource for a time period and wherein computing a change parameter by comparing the differences between successive measurements of the utilization parameter comprises determining if the utilization of the system is increasing and the standard deviation of the utilization of the system resource is decreasing based on the successive measurements.

6. The method of claim 1 wherein the utilization parameter is the median load of the utilization of the system resource for a time period and wherein computing a change parameter by comparing the differences between successive measurements of the utilization parameter comprises determining if the median load is less than the utilization of the system and then greater than the utilization of the system on a successive measurement.

7. A computer program product comprising:
    a computer useable medium having computer readable code means embodied thereon for causing a computer to execute a method for detecting and forecasting resource bottlenecks of a computer system, the computer readable code means in the computer program product including:
    computer readable program code means for causing a computer to monitor with successive measurements a utilization parameter of a system resource;
    computer readable program code means for causing a computer to compute a change parameter by comparing the differences between successive measurements of the utilization parameter;
    computer readable program code means for causing a computer to compare the change parameter to a threshold change parameter;
    computer readable program code means for causing a computer to report a resource bottleneck if the change parameter exceeds the threshold change parameter; and
    computer readable program code means for causing a computer to detect false bottleneck alarms and to modify the threshold change parameter based on the false bottleneck alarms to decrease a sensitivity.

8. The computer program product of claim 7 further comprising computer readable program code means for causing a computer to detect bottlenecks that are not reported resource bottlenecks and to modify the threshold change parameter based on detected bottlenecks that are not reported resource bottlenecks to increase a sensitivity.

9. The computer program product of claim 7 wherein the resource bottleneck is not reported until the change parameter exceeds the threshold change parameter on at least one successive measurement.

10. The computer program product of claim 7 wherein the utilization parameter is the average utilization of the system resource for a time period.

11. The computer program product of claim 7 wherein the utilization parameter is the standard deviation of the utilization of the system resource for a time period.

12. The computer program product of claim 7 wherein the utilization parameter is the median load of the utilization of the system resource for a time period.

13. A data processing system comprising:
    a processor; and
    a program code executed on the processor for detecting and forecasting resource bottlenecks, the program code including code for:
    monitoring with successive measurements a utilization parameter of a system resource;
    computing a change parameter by comparing the differences between successive measurements of the utilization parameter;
    comparing the change parameter to a threshold change parameter; and predicting a resource bottleneck if the change parameter exceeds the threshold change parameter;

wherein the program code further includes code for detecting false bottleneck alarms and modifying the threshold change parameter based on the false bottleneck alarms to decrease a sensitivity.

14. The data processing system of claim 13 wherein the program code further includes code for determining a corrective action to avoid the resource bottleneck.

15. The data processing system of claim 14 wherein the data processing system is a server within a LAN network and the utilization parameter is a percentage of CPU utilization.

16. The data processing system of claim 13 wherein the program code further includes code for detecting bottlenecks that are not reported resource bottlenecks and modifying the threshold change parameter based on detecting bottlenecks that are not reported resource bottlenecks to increase a sensitivity of the method.

17. The data processing system of claim 13 wherein the program code further includes code for reporting the resource bottleneck if the change parameter exceeds the threshold change parameter on at least one successive measurement.

* * * * *